United States Patent Office 3,708,305

Patented Jan. 2, 1973

3,708,305

PHOTOPOLYMERIZABLE COMPOSITIONS COMPRISING CELLULOSE DERIVATIVE

Shunichi Koyanagi and Kinya Ogawa, Naoetsu, Fujio Sekigawa, Okata-machi, Hiroshi Suzuki, Naoetsu, and Shigeru Ono, Kamakura, Japan, assignors to Shinetsu Chemical Company, Tokyo, Japan No Drawing. Filed June 8, 1971, Ser. No. 151,140
Claims priority, application Japan, June 17, 1970, 45/52,638
Int. Cl. G03c *1/68, 1/70*
U.S. Cl. 96—115 P 7 Claims

ABSTRACT OF THE DISCLOSURE

A photopolymerizable composition consisting of a photopolymerizable unsaturated compound, a photosensitizer and a cellulose derivative, said cellulose derivative being an ester of a polybasic acid of a cellulose ether represented by the general formula $R^1_mR^2_nA$ wherein $R^1$ is a hydroxyalkyl radical having 3 or 4 carbon atoms, $R^2$ is hydrogen or an alkyl radical having 1 or 2 carbon atoms, *m* and *n* are positive integers and A is a cellulose residue. Said composition is suitable for making printing plates, etc.

SUMMARY OF THE INVENTION

This invention relates to photopolymerizable compositions, especially to compositions consisting of a photopolymerizable unsaturated compound, a cellulose derivative and a photosensitizer, which are suitable for making printing plates, etc.

As is well known, a composition which can be polymerized by actinic light into an insoluble, tough structure has been used in order to obtain a printing plate. Such plates are used in the so-called photo-typesetter which provides a plate from camera film transmitted on a communication circuit, so that information can be delivered to distant places in a short time. Furthermore such a composition possesses the advantages of good workability and superior high-speed printability. Compositions of this type are exemplified by compositions consisting of an addition polymerizable compound having ethylene-type unsaturated bonds, a cellulose derivative having terminal free oxyacid groups or oxyacid salt groups where the salt-forming cation is an alkali metal, e.g., lithium, sodium, potassium, or is an ammonium or substituted ammonium radical, and an addition-polymerization initiator (cf. U.S. Pat. 2,927,022). Such compositions, however, are very sensitive to the moisture in the air, so that they become brittle when the humidity is low, and deteriorate when the humidity is high. Additionally, the development of such compounds is sometimes accompanied by difficulties because they are relatively insoluble in alkali solutions.

An object of this invention is to provide photopolymerizable compositions free from the faults given above, which are composed of a photopolymerizable unsaturated compound, a cellulose derivative and a photosensitizer, wherein the cellulose derivative is an ester of a dibasic or tribasic acid of a cellulose ether represented by the general formula $$R^1_mR^2_nA$$

wherein $R^1$ is a hydroxyalkyl radical having 3 or 4 carbon atoms, $R^2$ is hydrogen or an alkyl radical having 1 or 2 carbon atoms, *m* and *n* are positive integers, and A is a cellulose residue.

More particularly, the present invention relates to compositions in which the above-given ester of a polybasic acid of hydroxyalkyl cellulose or hydroxyalkyl alkylcellulose, is used. Based on our findings, as given in the following references, such cellulose derivatives are superior to cellulose acetate phthalate (hereinafter referred to as CAP) or methyl cellulose phthalate (MCP) which were hitherto employed in the compositions of this sort, with regard to stability, solubility in organic solvents and alkali, compatibility with photopolymerizable unsaturated compounds, such as, diethylene glycol dimethacrylate, and humidity resistance. Thus, when the present ester is used as a component, photopolymerizable compositions possessing superior properties for use in printing plates can be obtained with ease.

The cellulose derivative employed in preparing the compositions of the invention is an ester of dibasic or tribasic acid of cellulose ether represented by the general formula $$R^1_mR^2_nA$$

where $R^1$, $R^2$, *m, n* and A are described above, and the cellulose ether represented by such a general formula are exemplified by hydroxypropyl cellulose (HPC), hydroxypropyl methyl cellulose (HPMC), hydroxybutyl cellulose (HBC), hydroxybutyl methyl cellulose (HBMC), hydroxypropyl ethyl cellulose (HPEC) and hydroxybutyl ethyl cellulose (HBEC), and the dibasic or tribasic acid is exemplified by phthalic acid, tetrahydrophthalic acid, hexahydrophthalic acid, trimellitic acid, succinic acid, maleic acid and glutaric acid.

Such properties of the cellulose ether derivatives as solubility in organic solvents and aqueous bases, moisture permeability resistance, compatibility to photopolymerizable unsaturated compounds, and stability are much affected by the amounts of the substitution radicals contained in the cellulose ether from which they are prepared, so that the (molecular) number of the substitution moles per anhydrous glucose unit (abbreviated as M.S.) of hydroxyalkyl radicals contained in hydroxyalkyl cellulose had better be from 0.2 to 5.0, or more preferably from 1.0 to 4.0. In the case of hydroxyalkyl alkylcellulose, the M.S. of hydroxyalkyl radicals had better be at least 0.02, or more preferably at least 0.05, Furthermore, it is desirable in this case that the total of M.S. of hydroxyalkyl radicals and that of alkyl radicals is from 0.5 to 5.0 or more preferably from 1.0 to 4.0.

On the other hand, the M.S. of acyl radicals in said cellulose ether derivatives are preferably at least 0.2, or most preferably at least 0.3, while in the case of mixed esters, the M.S. of the acyl radicals are preferably at least 0.3.

The cellulose ether derivatives may be obtained by putting the cellulose ethers and polybasic acids in the prescribed amounts into an organic acid medium and reacting the mixture in the presence of an anhydrous alkali metal salt of acetic acid as the catalyst. The ratios in quantity of these raw materials vary in accordance with the kinds of the raw materials employed as well as with the properties desired of the product. Usually, 100 parts by weight of said cellulose ether is mixed with from 30 to 200 parts by weight of said dibasic and/or tribasic anhydride. As the organic acid medium, acetic acid, propionic acid or butyric acid is employed, and from 50 to 1,000 parts by weight, or more preferably, from 200 to 600 parts by weight of the organic acid is used per 100 parts by weight of the cellulose ether charged.

The anhydrous alkali metallic salt of acetic acid employed as the catalyst is used in amounts from 5 to 40 parts by weight added to 100 parts by weight of said organic acid medium. The reaction temperature is usually kept between 40 to 100° C., but it is more preferable to keep it between 60 and 100° C. in the early period of the reaction and between 40 and 80° C. in the late period of the reaction. Such a temperature arrangement will make it possible for the reaction to proceed remarkably well in the early stages and for the esterification of the reactants to be promoted in the later stage. The reaction time is usually between 2 and 20 hours, depending upon the reaction conditions.

As both the starting materials and the reaction product are soluble in the organic acid medium, the reaction proceeds in a uniform system, and when the reaction is over, the whole system will be a transparent viscous liquid. If this liquid is poured into a large amount of water, or a large amount of water is poured into it, the reaction product precipitates. This may then be filtered off, washed with water, dried and recovered as a white powder.

The cellulose ether derivative prepared by the above mentioned method is a monoester compound in which one of the acid radicals contained in the acid anhydride, which was employed as the starting material, is combined with a hydroxyl radical of the cellulose or of the hydroxyalkyl radicals in said cellulose ether to form an ester, with the remaining acid radicals being converted into free carboxyl radicals. Examples of these derivatives are the tetrahydrophthalic monoester and hexahydrophthalic monoester of said cellulose ether, and a mixed monoester prepared by partial reaction of phthalic anhydride and trimellitic anhydride. The esters thus prepared are highly soluble in single or mixed solvents such as acetone, methyl alcohol, ethyl alcohol, isopropyl alcohol, methyl Cellosolve, ethyl Cellosolve, dioxane ether, methylethyl ketone, diacetylene alcohol, benzene, toluene, methyl lactate, methyl acetate, ethyl acetate, methylene chloride, trichlorethylene, methyl chloroform, chloroform and ethylene chloride, and especially in an aqueous solution of an alkali and they show moisture permeability resistance and stability superior to that of known cellulose ethers.

The photopolymerizable compound composing the compositions of the invention may be selected from the known group consisting of monomers, such as, acrylic acid, methacrylic acid, α-chloroacrylic acid, acrylamide, methacrylamide, N-hydroxyethyl acrylamide, ethylene glycol diacrylate, diethylene glycol diacrylate, triethylene diacrylate, ethylene glycol dimethacrylate, diethylene glycol dimethacrylate, and triethylene glycol dimethacrylate; unsaturated polyesters obtained by the polycondensation of a polyvalent alcohol, such as, ethylene glycol, polyethylene glycol, propylene glycol, polypropylene glycol and glycerine, with a polyvalent carboxylic acid such as maleic acid, fumaric acid, citraconic acid and itaconic acid; those containing as their polyester components an unsautrated polyvalent alcohol and saturated polyvalent carboxylic acid; and mixtures of said unsaturated polyesters and vinyl monomers, such as, acrylic acid.

The photosensitizer which must be added to the composition is selected from the group consisting of benzoin, benzoin methyl ether, benzoin ethyl ether, α-methyl benzoin, dibenzyl, diacetyl, diphenyl disulfide, eosin, and thionin.

The compositions of the invention can be obtained by mixing from 10 to 80 parts by weight of a photopolymerizable compound with from 20 to 90 parts by weight of a cellulose derivative, and further adding to the mixture a photosensitizer in an amount of from 0.001 to 6.0 parts by weight based on the total weight of the mixture. If the amount of the photosensitive compound is 10 parts or less, the composition will have a low photopolymerization rate, and the mechanical strength of the resin plate prepared from it will be poor. If it is 80% or more, the resin plate prepared will be too soft. These components can either be solid, semi-solid, or liquid, and to them, if necessary, may be added a known thermalpolymerization inhibitor, such as, hydroquinone, monotertiary butyl hydroquinone, catechol, p-tertiarybutyl catechol, 2,5-ditertiarybutyl catechol, benzoquinone, 2,5-diphenyl-p-benzoquinone, or phenothiazine. As a filler and reinforcing agent, cellulose ethers having no acid radicals, cellulose esters, various inorganic fillers, such as, organophylic silica, bentonite, glass, or quartz, may be added. The thermopolymerization inhibitor is added in an amount of from 0.001 to 2.0 parts by weight and the filler is added in an amount of at most 35 parts by weight.

The composition of the invention is processed into a layer from 0.01 to 3.0 mm. thick, and when it is exposed to irradiation through a proper negative film, polymerization proceeds in the exposed parts, giving insoluble latent images which have been quite completely polymerized. Subsequently the unpolymerized parts are removed by employing a suitable solvent, and a plate, useful as a relief, can be obtained with ease. In the present composition, a cellulose derivative consisting of an ester of a polybasic acid of the above-given hydroxyalkyl cellulose or hydroxyalkyl alkyl cellulose is used which provides a relief superior in print-durability and storage. Such a cellulose derivative does not isolate organic acids, e.g., acetic acid, so that there is no fear of the acid attacking the supporting plate. Additionally, it has superior solubility in organic solvents, compatibility with photopolymerizable unsaturated compounds, and provides a resin plate with a uniform and smooth surface and a proper hardness free from brittleness. Furthermore its superior solubility in alkali enables the development of the plate to be carried out with great ease, and the apparatus employed for the development can be of simpler structure and operated with greater safety than in the case of development wherein an organic solvent is employed.

Hereunder are descriptions of the methods for preparing cellulose derivatives employed as a component of the compositions of the invention, together with their physical properties, and examples and controls of the methods for preparing compositions in which they are employed. In the references and examples, parts and percentages are all parts and percentages by weight unless otherwise specified.

Reference 1

(a) Preparation of hydroxypropyl methyl cellulose·phthalate (HPMCP): In a reactor provided with a stirrer were put 50 parts of HPMC (M.S. of hydroxypropoxyl radical=0.27, M.S. of methoxyl radical=1.87, and the viscosity of a 2% aqueous solution of HPMC at 25° C.=5 cps.), 100 parts of glacial acetic acid, 25 parts of sodium acetate (anhydrous salt) and 70 parts of phthalic anhydride. The contents were stirred so as to be reacted at 85° C. for 2 hours, and then at 65° C. for 3 hours. To the transparent viscous liquid obtained by the reaction were added 800 parts of water and the precipitate was filtered off, washed with water, and dried at 60° C. for 5 hours. The product obtained was HPMCP phthalyl radical: 0.85).

(b) Preparation of hydroxypropyl cellulose·phthalate (HPCP): An experiment was conducted just as in (a) in which the only difference was the use of HPC (M.S. of hydroxypropoxyl radical=3.0, and the viscosity of a 2% aqueous solution of HPC=5 cps.) instead of HPMC, to obtain HPCP (M.S. of phthalyl radical=1.65).

(c) Preparation of hydroxypropyl methyl cellulose·tetrahydrophthalate (HPMCTHP): An experiment was conducted just as in (a) in which the only difference was the use of tetrahydrophthalic anhydride instead of phthalic anhydride, to obtain HPMCTHP (M.S. of tetrahydrophthalyl radical: 0.85).

(d) Preparation of hydroxypropyl methyl cellulose·hexahydrophthalate (HPMCHHP): An experiment was conducted just as in (a) in which the only difference was the use of hexahydrophthalic anhydride instead of phthalic anhydride, to obtain HPMCHHP (M.S. of hexahydrophthalyl radical=0.85).

(e) Preparation of hydroxybutyl methylcellulose·tetrahydrophthalate (HBMCTHP): An experiment similar to the one described in (a) was conducted in which the differences were the use of hydroxybutyl methyl cellulose (M.S. of hydroxybutyl radicals: 0.21, M.S. of methyl radicals: 1.85) instead of hydroxypropyl methyl cellulose and that of tetrahydrophthalic anhydride instead of phthalic anhydride, to obtain the tetrahydrophthalic acid ester of hydroxybutyl methylcellulose (M.S. of tetrahydrophthalyl radicals: 0.81).

(f) Preparation of hydroxypropyl methylcellulose·phthalate·tetrahydrophthalate (HPMCP·THP): In a reactor equipped with a stirrer were put 50 parts of hydroxypropyl methylcellulose (the reactor was similar to the one employed in (a)), 200 parts of glacial acetic acid, 50 parts of anhydrous sodium acetate, 30 parts of tetrahydrophthalic anhydride, and 30 parts of phthalic anhydride. The contents were stirred and reacted at first at 85° C. for 2 hours, and then at 60° C. for 3 hours. To the transparent viscous liquid prepared by the reaction were added, under agitation, 1,600 parts of water, and the precipitate obtained was filtered off, washed with water and dried at 60° C. for 5 hours. The product thus obtained analyzed as mixed monoesters with the M.S. of the tetrahydrophthalyl radicals being 0.41 and that of the phthalyl radicals being 0.40.

(g) Preparation of hydroxypropyl methylcellulose·hexahydrophthalate·trimellitate (HPMCHHP·TM): An experiment similar to the one described in (f) was conducted in which the differences were the use of 30 parts of hexahydrophthalic anhydride and 35 parts of trimellitic anhydride, both as the acid anhydride, and of anhydrous potassium acetate instead of anhydrous sodium acetate, to obtain mixed monoesters with the M.S. of the hexahydrophthalyl radicals being 0.41 and that of the trimellityl radicals being 0.35.

Reference 2

Various cellulose derivatives obtained in Reference 1 and well known CAP (M.S. of acetyl radical=1.66, and M.S. of phthalyl radical=0.75) and MCP (M.S. of phthalyl radical=0.71 and M.S. of methoxyl radical=1.87) were tested in order to determine their solubilities in organic solvents and McIlvaine buffer solution, water resistance and stability. The results obtained are given in Table 1.

TABLE 1.—SOLUBILITIES

| Sample | HPMCP | HPCP | HPMC·THP | HPMC·HHP | HBMC·THP | HPMCP·THP | HPMC·HHP·TM | CAP | MCP |
|---|---|---|---|---|---|---|---|---|---|
| Solvent: | | | | | | | | | |
| Acetone | S | S | S | S | S | S | S | S | SW |
| Methanol | S | S | S | S | S | SW | S | IS | IS |
| Ethylacetate | SW | SW | S | SW | SW | SW | SW | SW | IS |
| Acetone-methanol | S | S | S | S | S | S | S | S | S |
| Methylene chloride-methanol | S | S | S | S | S | S | S | S | S |
| Toluene-methanol | S | S | S | S | S | S | S | S | S |
| pH for resolution | 5.4 | 6.4 | 7.0 | 7.0 | 7.0 | 6.4 | 5.6 | 6.0 | 6.0 |

Remarks:

(1) In the table, mark S shows that the sample was soluble in the solvent or liquid, while mark SW shows that it was swollen by it, and mark IS shows that it was insoluble in it.

(2) By the value of pH for resolution is shown the minimum pH of the solution at which it dissolves in McIlvaine buffer solution.

(3) The mixed solvents were each composed of the solvents in a volumetric ratio of 1:1.

TABLE 2.—WATER RESISTANCE

| Sample Item: | Humidity penetration rate (g./cm.$^2$·24 hrs.) |
|---|---|
| HPMCP | 0.0202 |
| HPCP | 0.0034 |
| HPMC·THP | 0.0130 |
| HPMC·HHP | 0.0085 |
| HBMC·THP | 0.0075 |
| HPMCP·THP | 0.0132 |
| HPMC·HHP·TM | 0.0145 |
| CAP | 0.0222 |
| MCP | 0.0236 |

Remarks: A 0.1 mm. thick film was prepared of each sample, and the penetration of humidity through the film from conditions of 40° C. and R.H. of 100% to those of 40° C. and R.H. of 50% or under was measured by the weight increase of calcium chloride due to its moisture absorption.

TABLE 3.—STABILITY (AMOUNT OF ACID ISOLATED, PERCENT)

| Sample | HPMCP | HPCP | HPMC·THP | HPMC·HHP | HBMC·THP | HPMCP·THP | HPMC·HHP·TM | CAP | MCP |
|---|---|---|---|---|---|---|---|---|---|
| Days elapsed: | | | | | | | | | |
| 0 | 0.3 | 0.4 | 1.9 | 1.5 | 1.5 | 1.0 | 1.2 | 0.9 | 0.2 |
| 1 | 0.5 | 0.5 | 2.2 | 2.0 | 1.8 | 1.6 | 2.0 | 2.1 | 1.0 |
| 2 | 0.9 | 0.7 | 2.3 | 2.5 | 2.1 | 2.1 | 2.6 | 3.7 | 1.8 |
| 5 | 1.4 | 1.0 | 2.5 | 3.4 | 2.5 | 2.6 | 3.5 | 6.4 | 2.5 |
| 10 | 2.4 | 1.2 | 2.6 | 3.8 | 2.7 | 3.4 | 4.0 | 9.8 | 3.6 |
| 15 | 2.5 | 1.3 | 2.6 | 3.8 | 2.8 | 3.5 | 4.3 | 11.4 | 3.9 |

Remarks:

(1) The figures in the table were obtained by measuring by means of neutralization the amount of acid isolated from the samples placed under conditions of 60° C. and saturated humidity.

(2) In the column where the passage of days is 0 are given the results of the blank test.

EXAMPLE 1

5 parts of HPMCP prepared as in Reference 1, 2 parts of triethylene glycol dimethacrylate and 0.1 part of benzoin methyl ether were dissolved in 10 parts of a mixture of solvents—methylene chloride and methanol (1:1), and the solution was cast on a glass plate to give a film, which was allowed to stand at room temperature in a dark room for 3 days so that the solvents would evaporate. On a 0.50 mm. thick film thus prepared was placed a negative film, and this was exposed for 7 minutes to the irradiation of a 400 w. high-pressure mercury lamp placed at a distance of 30 cm. from the surface of the film. When the film thus treated was developed with a 1.5% aqueous solution of sodium bicarbonate, the printing reliefs obtained had the images from the negative film sharply reproduced on it, and these possessed sufficient strength to be employed for printing.

EXAMPLE 2

The 0.50 mm. thick film prepared in Example 1 was allowed to stand at 50° C. and 80% humidity for 1,000 hours, without any change, and when the thus treated film was irradiated and developed as described in Example 1, the printing reliefs obtained exhibited the same properties as given above.

But, when, as a control, the same experiment was conducted in which HPMCP was replaced by CAP (M.S. of acetyl radical=1.66, and M.S. of phthalyl radical=0.75), the surface of the film became cloudy and a white powdery substance, which from its IR spectrum appeared to be phthalic acid, was observed to adhere to it. When the film was irradiated just as in Example 1, the relief obtained was soft, and the images on it were obscure, and even when the exposure time was doubled, the obscurity was only slightly improved.

EXAMPLE 3

5.0 parts of HPCP prepared in Reference 1, 5.0 parts of diethyleneglycol dimethacrylate and 0.1 part of benzoin methyl ether were dissolved in a mixture of solvents—toluene and methanol (1:1), and the solution was cast on a glass plate to give a film, which was allowed to stand in a dark room so that the solvents evaporated. This film was exposed for 15 minutes to the irradiation of a 20 w. chemical lamp placed at the distance of 20 cm. from the surface of the film and then developed with a 1% aqueous solution of sodium bicarbonate. The printing reliefs thus obtained had clear images on it, and although it was rather soft, it was useful for printing.

Control

An experiment similar to the one described in Example 3 was carried out in which the only difference was the use of MCP instead of HPCP. The film obtained had diethylene glycol dimethacrylate exuded over the surface, and no printing reliefs of uniform strength were obtained.

EXAMPLE 4

Printing reliefs were prepared just as in Example 1, employing HPMCP prepared in Reference 1, but varying the compositions of the photopolymerizable components, obtaining the results given in Table 4.

TABLE 4

| HPMCP, parts | Photosensitizer (parts) | Polymerizable compound (parts) | Observations |
|---|---|---|---|
| 5.0 | Benzene methyl ether (0.1). | Diethylene glycol dimethacrylate (3.0). | Clear and good relief was obtained. |
| 5.0 | do | Triethylene glycol dimethacrylate (5.0). | Clear and printable relief was obtained. |
| 5.0 | Benzoin (0.5) | Triethylene glycol diacrylate (1.0). | Somewhat dim but printable relief was obtained. |
| 6.0 | do | Triethylene glycol dimethacrylate (4.0). | Clear and good relief was obtained. |

EXAMPLE 5

Employing HPMCTHP prepared in Reference 1, an experiment was conducted just as in Example 1 in which the only difference was the use of a 1% aqueous solution of ammonia as a developing agent instead of a 1.5% aqueous solution of sodium bicarbonate. In this case, too a clear-cut and printable relief was obtained.

EXAMPLE 6

Printing reliefs were prepared just as in Example 1, employing HPMCTHP, HPMCP·THP, HBMCTHP, and HPMCHHP·TM prepared in Reference 1, but varying the compositions of the photopolymerizable components, obtaining the results given in Table 5.

TABLE 5

| Cellulose derivatives (parts) | Photosensitizer (parts) | Polymerizable compound (parts) | Observations |
|---|---|---|---|
| HPMCTHP (5.0) | Benzoin methyl ether (0.1) | Diethylene glycol dimethacrylate (3.0) | Somewhat dim but printable relief was obtained |
| HBMCTHP (5.0) | Benzoin (0.05) | Triethylene glycol dimethacrylate (3.0) | Clear and printable relief was obtained. |
| HPMCP·THP (5.0) | Benzoin (0.5) | Diethylene glycol dimethacrylate (4.0) | Do. |
| HPMCHHP·TM (5.0) | Benzoin ethyl ether (0.2) | Triethylene glycol dimethacrylate (5.0) | Do. |

EXAMPLE 7

60 parts of fumaric acid, 40 parts of succinic anhydride, 300 parts of polyethylene glycol 600 (average molecular weight: 600) and 20 parts of propylene glycol were reacted in a nitrogen atmosphere for about 15 hours at a temperature not exceeding 180–190° C., obtaining unsaturated polyester, to 30 parts of which were added 0.6 part of hydroquinone, 30 parts of HPMCP prepared in Reference 1, 40 parts of acrylamide, and 0.3 part of benzoinmethyl ether. These components were mixed and stirred at a temperature of about 90° C. The product proved to be a semisolid composition. Said composition was cast on a glass plate into a layer of 0.7 mm. thickness, on which was placed a negative film which was exposed to the irradiation of a 400 w. high-pressure mercury lamp placed at a distance of 30 cm. from the surface of the film. When the film thus treated was developed with a 0.5% aqueous solution of sodium bicarbonate, a clear-cut and flexible printing relief was obtained.

What is claimed is:

1. A photopolymerizable composition consisting of a photopolymerizable unsaturated compound, a photosensitizer and a cellulose derivative, said cellulose derivative being an ester of polybasic acid of a cellulose ether represented by the general formula:

$$R^1_mR^2_nA$$

wherein $R^1$ is a hydroxyalkyl radical having 3 or 4 carbon atoms, $R^2$ is hydrogen or an alkyl radical having 1 or 2 carbon atoms, *m* and *n* are positive integers and A is a cellulose residue.

2. The photopolymerizable composition claimed in claim 1, wherein said composition is composed of from 10 to 80 parts by weight of said photopolymerizable unsaturated compound, from 20 to 90 parts by weight of said cellulose derivative, and from 0.001 to 6.0 parts by weight of said photosensitizer.

3. The photopolymerizable composition claimed in claim 1, wherein said cellulose ether is selected from the group consisting of hydroxypropyl cellulose, hydroxybutyl cellulose, hydroxypropyl methyl cellulose, hydroxybutyl methyl cellulose, hydroxypropyl ethyl cellulose, and hydroxybutyl ethyl cellulose.

4. The photopolymerizable composition claimed in claim 1, wherein said polybasic acid is selected from the group consisting of phthalic acid, tetrahydrophthalic acid, hexahydrophthalic acid, trimellitic acid, succinic acid, maleic acid and glutaric acid.

5. The photopolymerizable composition claimed in claim 1, wherein said cellulose derivative is selected from the group consisting of hydroxypropyl cellulose phthalate, hydroxypropyl methyl cellulose phthalate, hydroxybutyl methyl cellulose phthalate, hydroxypropyl methyl cellulose tetrahydrophthalate, hydroxypropyl methyl cellulose hexahydrophthalate, hydroxybutyl methyl cellulose tetrahydrophthalate, hydroxypropyl methyl cellulose phthalate·tetrahydrophthalate, hydroxypropyl methyl cellulose hexahydrophthalate·trimellitate.

6. The photopolymerizable composition claimed in claim 1, wherein said photopolymerizable unsaturated compound is selected from the group consisting of acrylic acid, methacrylic acid, α-chloroacrylic acid, acrylamide, methacrylamide, N-hydroxyethyl acrylamide, ethylene glycol diacrylate, diethylene glycol diacrylate, triethylene diacrylate, ethylene glycol dimethacrylate, unsaturated polyesters obtained by the polycondensation of a polyvalent alcohol with a polyvalent carboxylic acid and mixtures thereof.

7. The photopolymerizable composition claimed in claim 1, wherein said photosensitizer is selected from the group consisting of benzoin, benzoin methyl ether, benzoin ethyl ether, α-methyl benzoin, dibenzyl, diacetyl, diphenyl disulfide, eosin and thionin.

References Cited

UNITED STATES PATENTS

| | | | |
|---|---|---|---|
| 2,927,022 | 3/1960 | Martin | 96—115 P |
| 2,927,023 | 3/1960 | Martin | 96—115 P |

RONALD H. SMITH, Primary Examiner

U.S. Cl. X.R.

96—35.1; 204—159.12